(12) United States Patent
Mathew et al.

(10) Patent No.: US 7,184,094 B2
(45) Date of Patent: Feb. 27, 2007

(54) DECODING SYSTEM, VIDEO COLOR CONVERTER AND METHOD THEREOF

(75) Inventors: Reji Mathew, Riverwood (AU); Zhenghua Yu, North Epping (AU)

(73) Assignee: Motorola, Inc., Schaumburg, IL (US)

( * ) Notice: Subject to any disclaimer, the term of this patent is extended or adjusted under 35 U.S.C. 154(b) by 880 days.

(21) Appl. No.: 10/313,244

(22) Filed: Dec. 6, 2002

(65) Prior Publication Data
US 2004/0109086 A1    Jun. 10, 2004

(51) Int. Cl.
*H04N 7/01* (2006.01)
*H04N 11/20* (2006.01)

(52) U.S. Cl. .................. 348/453; 375/240.03

(58) Field of Classification Search .......... 348/422, 348/399, 403–405, 420, 458, 396.1, 450, 348/444, 489, 453; 382/248, 262, 272, 268, 382/166, 298, 56, 236, 239, 253; 375/240.03, 375/240.27, 240.17, 240.01
See application file for complete search history.

(56) References Cited
U.S. PATENT DOCUMENTS 5,467,413 A * 11/1995 Barrett ................. 382/236
5,634,850 A *  6/1997 Kitahara et al. ............ 463/33
5,703,697 A * 12/1997 Normile .................. 382/248
5,864,345 A *  1/1999 Wickstrom et al. ........ 345/431
6,717,987 B1 *  4/2004 Scarpino et al. ..... 375/240.03

* cited by examiner

*Primary Examiner*—Tung Vo
*Assistant Examiner*—Behrooz Senfi

(57) ABSTRACT

A decoding system, a RGB video color converter and a method for color conversion of at least part of a decoded currently received YUV frame representing an image is provided. The currently received YUV frame includes image blocks and RGB color conversion is performed by storing a previous color conversion RGB image in a RGB buffer, the image being from an immediately preceding received decoded frame. Next, identifying is effected for identifying the image blocks of the decoded currently received YUV frame that are unchanged relative to corresponding previous image blocks in an immediately preceding received decoded frame. Thereafter, selectively performing YUG to RGB color conversion is effected only on the image blocks of the currently received YUV frame that are not unchanged relative to the corresponding previous image blocks. This provides selected RGB converted blocks for the current frame and then selectively updating image blocks in the buffer with selected RGB converted blocks for the current frame is performed. The resulting RGB image is then displayed on a display module.

14 Claims, 4 Drawing Sheets

DECODING SYSTEM, VIDEO COLOR CONVERTER AND METHOD THEREOF

FIELD OF THE INVENTION

This invention relates to color conversion of decoded video frames. The invention is particularly useful for, but not necessarily limited to, real-time video YUV to RGB color conversion.

BACKGROUND ART

Video is now a common component of multimedia communications and in an attempt to transmit video sequences efficiently over communication channels video sequences are typically encoded and compressed. Typically, video sequences are compressed according to video compression standards such as H.263 and MPEG-4. Such compression standards exploit the temporal and spatial redundancies in a video sequence to reduce the bandwidth required for transmission. For example, two consecutive frames in a video sequence often differ only slightly and compression techniques may take advantage of the redundancy in the two frames by only encoding the differences between these frames.

In general, a frame is analyzed at a block level where a block typically comprises an 8 by 8 array of pixels of the image. Usually, compression is conducted at the block level and only blocks of a current frame that are identifiably different to corresponding image blocks in the immediately preceding decoded frame are coded and transmitted (or coded and stored for later use). Blocks that are substantially unchanged are simply identified and a simple flag is set or a field coded in the coded bit streams. When the coded bit streams are later decoded for providing an image, the decoded image is in the form of a YUV image that is then processed into a RGB image by a color conversion technique. However, known color conversion techniques do not exploit the redundancy associated with the substantially unchanged respective blocks of consecutive frames.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for color conversion of at least part of a decoded currently received YUV frame representing an image, wherein the currently received YUV frame comprises image blocks, the method including:

storing a previous color conversion RGB image in a buffer, the image being from an immediately preceding received decoded frame;

identifying the image blocks of the decoded currently received YUV frame that are unchanged relative to corresponding image blocks at an identical spatial location in an immediately preceding received decoded frame;

selectively performing YUV to RGB color conversion only on the image blocks of the currently received YUV frame that are not unchanged relative to the corresponding image blocks in an immediately preceding received decoded frame, the performing providing selected RGB converted blocks for the current frame; and selectively updating image blocks in the buffer with selected RGB converted blocks for the current frame.

Preferably, the selectively performing YUV to RGB color conversion and) the Selectively updating image blocks may occur sequentially on each said macro-block.

Suitably, the selectively performing YUV to RGB color conversion and the Selectively updating image blocks may occur sequentially on a group comprising more than one said macro-block.

Preferably, the method may only be effected if a threshold number of skipped sets of micro-blocks in the currently received YUV frame exceeds a threshold value, wherein a skipped set is a macro-block or micro-block of the currently received YUV frame that is unchanged relative to corresponding image blocks at an identical spatial location in an immediately preceding received decoded frame.

Suitably, after the selectively updating image blocks in the buffer with selected RGB converted blocks for the current frame, an RGB image in the RGB buffer may be displayed on a display module.

Preferably, the image blocks may be macro-blocks.

Suitably, the image blocks may be micro-blocks.

According to another aspect of the invention there is provided a video color converter for color conversion of at least part of a decoded currently received YUV frame representing an image, wherein the currently received YUV frame comprises image blocks, the video color converter including:

a YUV buffer;

a RGB buffer; and a color conversion module with an input coupled to an output of the YUV buffer, the color conversion module also has a output coupled to an input of the RGB buffer, Wherein, in use, a previous color conversion RGB image, converted by the color conversion module, is stored in the RGB buffer, the image being from an immediately preceding received decoded frame, and wherein the color conversion module selectively performs YUV to RGB color conversion only on image blocks of a currently received YUV frame that are not unchanged relative to corresponding image blocks at an identical spatial location in an immediately preceding received decoded frame, the performing providing selected RGB converted blocks for the current frame, and thereafter image blocks in the RGB buffer are Selectively updated.

Preferably, the video color converter includes a display module, wherein, in use after the selectively updating image blocks in the buffer with selected RGB converted blocks for the current frame, an RGB image in the RGB buffer may be displayed on the display module.

According to another aspect of the invention there is provided a video decoding system for decoding a coded video bit stream, the system comprising:

a receiver module for receiving the coded video bit stream;

a decoding module with an input coupled to an output of the receiver module;

a video color converter having an input coupled to an output of the decoding module, the video color converter having a YUV buffer, a RGB buffer, and a color conversion module with an input coupled to an output of the YUV buffer, the color conversion module also has a output coupled to an input of the RGB buffer, wherein, in use, the video color converter provides for color conversion of at least part of a decoded currently received and decoded bit stream in the form of a currently received YUV frame representing an image comprising image blocks, and a previous color conversion RGB image, converted by the color conversion module, is stored in the RGB buffer, the image being from an immediately preceding received decoded frame, and wherein the color conversion module selectively performs YUV to RGB color conversion only on image blocks of a currently received YUV frame that are not unchanged relative to corresponding image blocks at an identical spatial location in an immediately preceding received decoded frame, the performing providing selected RGB converted blocks for the current frame, and thereafter image blocks in the RGB buffer are Selectively updated.

Preferably, the decoding system includes a display module, wherein, in use after the selectively updating image blocks in the buffer with selected RGB converted blocks for the current frame, an RGB image in the RGB buffer may be displayed on the display module.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
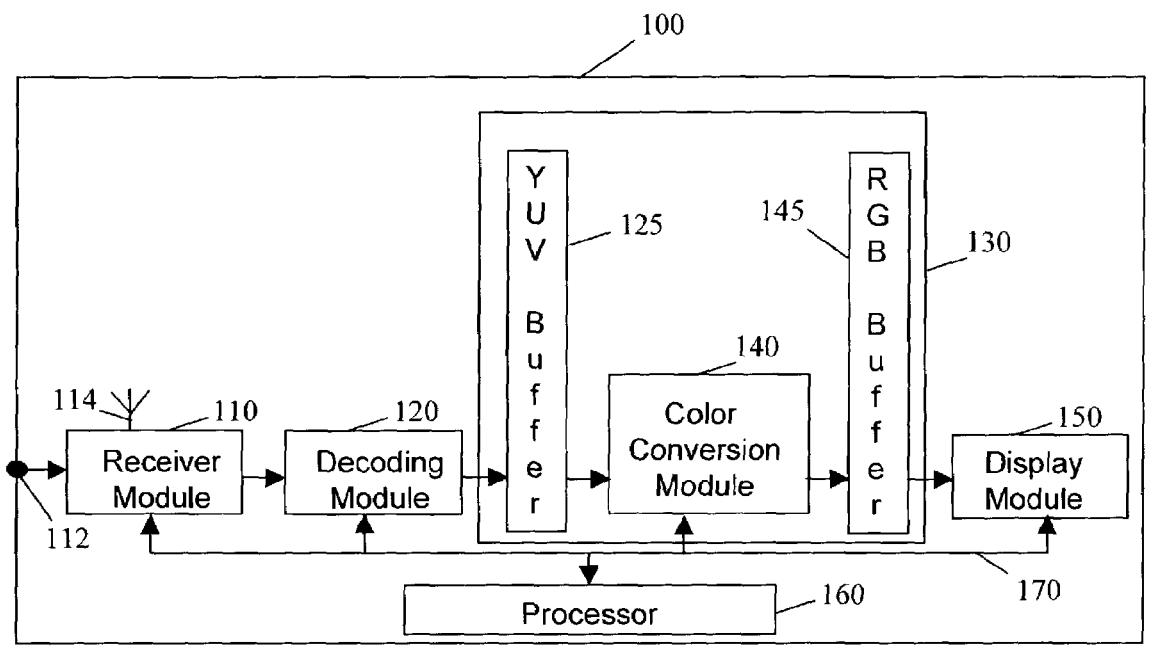
FIG. 1 is a block diagram of a video decoder including a RGB color converter in accordance with the invention.

In the drawings, like numerals on different FIGS. are used to indicate like elements throughout. With reference to FIG. 1, there is illustrated a video decoding system 100 comprising a receiver module 110 with a cable port 112 for receipt of images (a coded video bit stream) through a network and an antenna 114 for receipt of images by radio communications. Alternatively, the images can be received, at port 112, via a recorded medium such as a CD-ROM. An output of the receiver module is coupled to a decoding module 120 that has an output coupled to an input of a RGB color converter 130. An output of the RGB color converter 130 is coupled to an input of a display module 150. All of the modules 110, 120, 130 and 150 are coupled to a processor 160 by a common combined data and address bus 170. The RGB color converter 130 comprises a YUV buffer 125 with an input that coupled to the output of the decoding module 120. The RGB color converter 130 includes a color conversion module 140 with an input coupled to an output of the YUV buffer 125 and the color conversion module 140 has an output coupled to a RGB buffer 130. The RGB buffer 130 has an output coupled to the input of the display module 150 and the color conversion module 140 is coupled to the processor 160 by the common combined data and address bus 170.

In use, the system 100 receives a coded image stream at either the cable port 112 or antenna 114 or via a digitally stored medium. The receiver module 110 performs demodulation and filtering as required on the coded image stream and the decoding module 120 decodes the coded image stream to provide a decoded image in the form of a YUV color image. The RGB color converter 130 performs color conversion to provide a RGB image for storage and later use or it is immediately displayed by the display module 150. The operation of the system 100 is controlled by the processor 160, as will be apparent to a person skilled in the art, and the processor 160 may include large memory storage capabilities for storing the RGB image for later use.

Figure 2A:
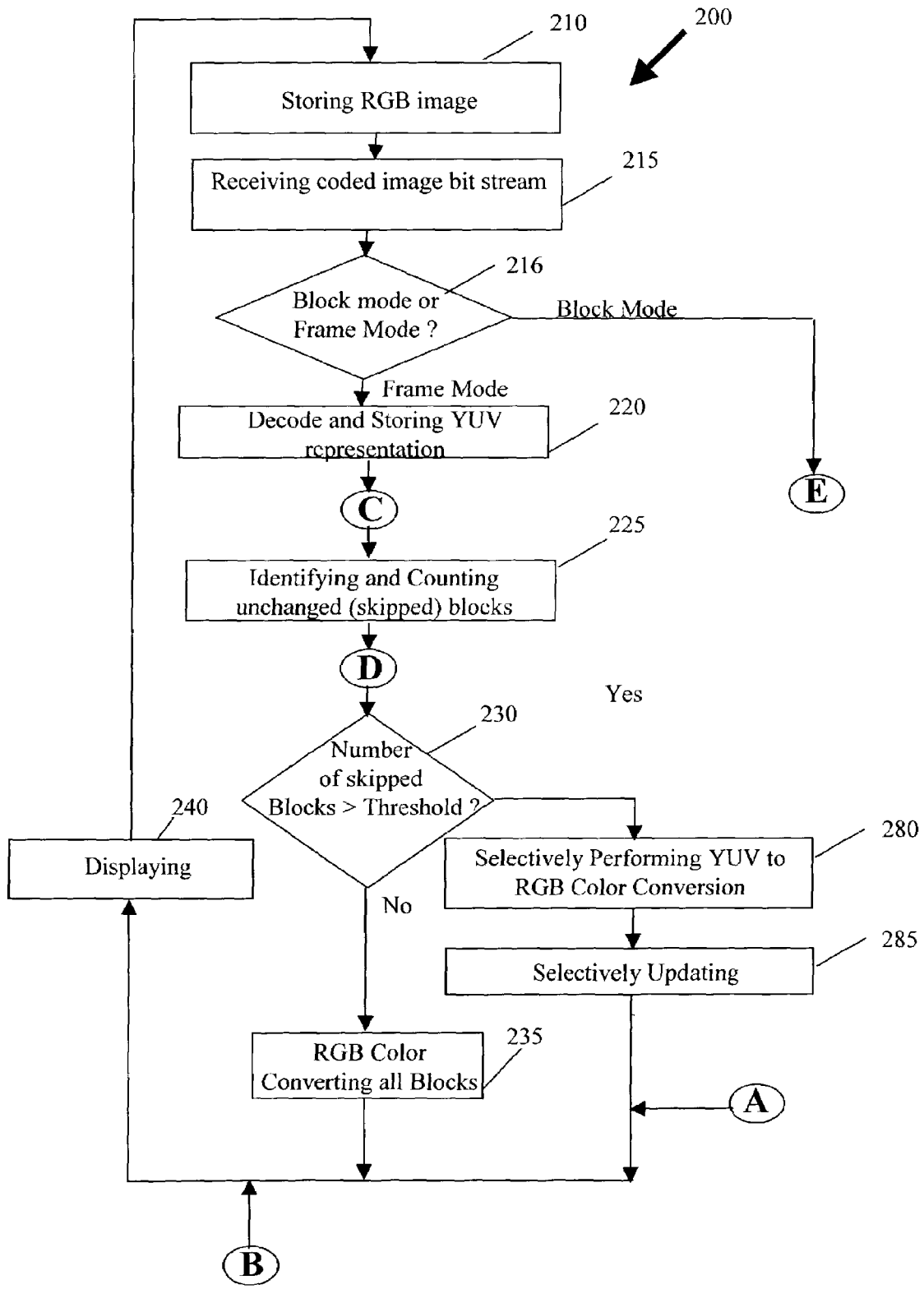
FIGS. 2a, 2b and 2c show a flow chart illustrating a method for color conversion in accordance with the invention and effected by the RGB color converter of FIG. 1.
Figure 2B:
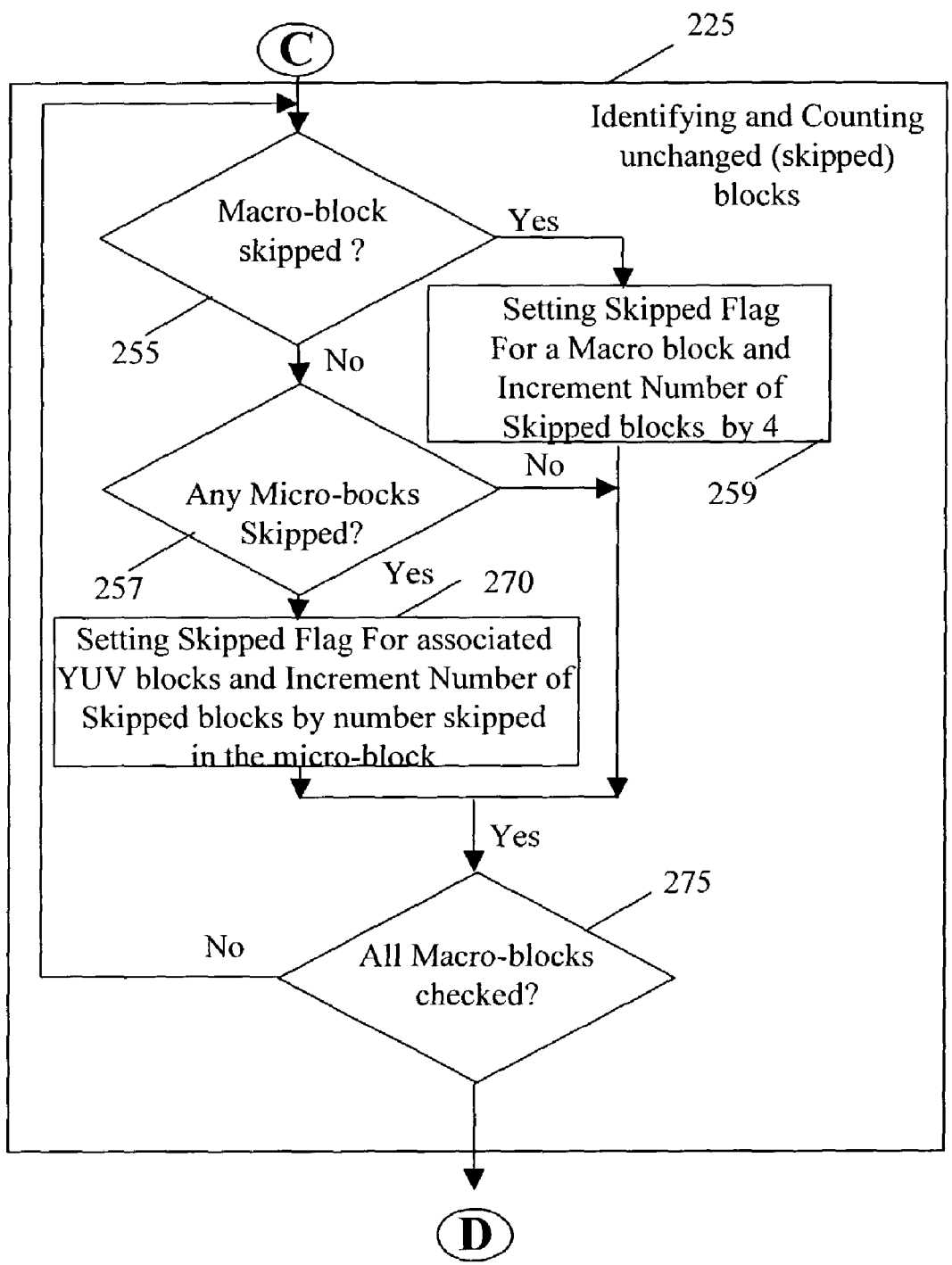
Figure 2C:
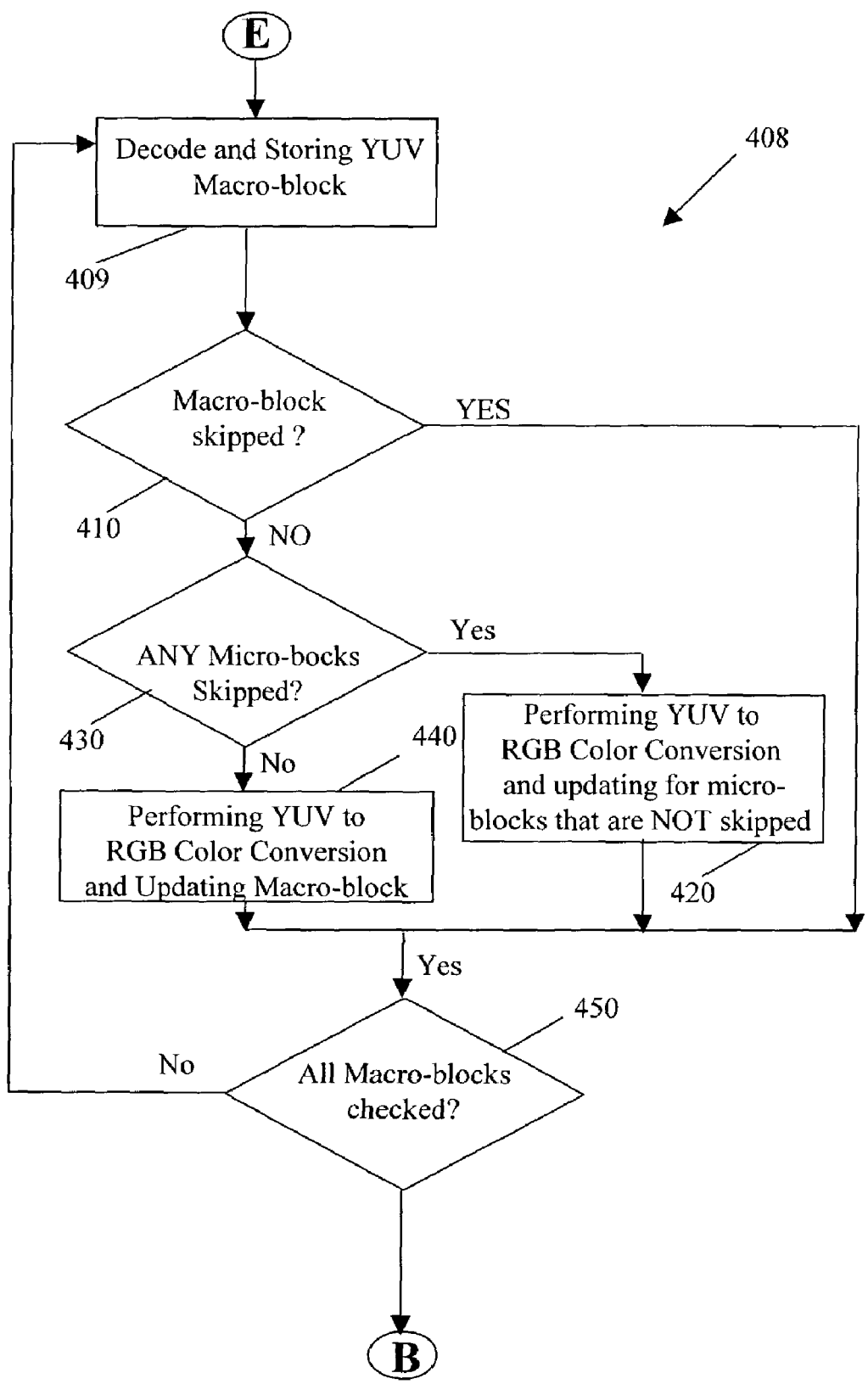

Referring to FIGS. 2a, 2b and 2c there is illustrated method for color conversion 200 of at least part of a decoded currently received YUV frame representing an image. The currently received YUV frame comprises image blocks (described later) and for simplicity the method as shown assumes that at least one YUV frame has been previously converted into an RGB frame representing an image (otherwise an initialization routine is required as is apparent to a person skilled in the art). At a storing step 210 the method 200 provides for storing a previous color conversion RGB image in the RGB buffer 130, the image being from an immediately preceding received decoded frame decoded by the system 100 and color converted by converter 130. A receiving step 215 for receiving a coded bit stream representing an image (comprising blocks) is effected. The coded bit stream is received and processed by the receiver module 110. A block mode or frame mode decision 216 is then performed. If operating in Frame Mode then at step 220 the received bit stream is decoded by decoding module 120 and a YUV frame representation is stored in the YUV buffer 125.

The method 200 then, at an Identifying and counting unchanged blocks step 225, identifies and counts a number of skipped sets of micro-blocks in the YUV frame representation that was stored in the YUV buffer 125 at the step 220. In this regard, preferably each micro-block is a luminance and associated chrominance block set as described in FIG. 3.

Figure 3:
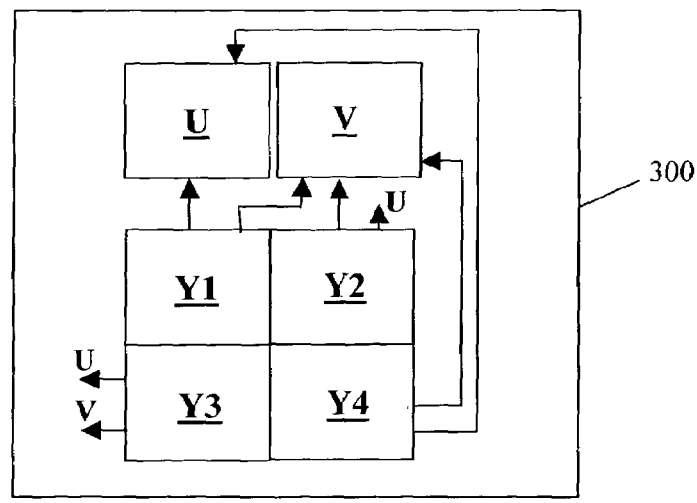
FIG. 3 illustrates macro-blocks and sub-blocks of a decoded YUV image.

Briefly referring to FIG. 3, a frame includes a plurality macro-blocks 300 that are the top level of a two-tier block hierarchy. In this example, each macro-block 300 comprises four luminance and associated chrominance block sets in the form of luminance micro-blocks Y1,Y2,Y3,Y4 and an associated set of two chrominance micro-blocks U,V. However, other types of macro-blocks can be used depending on the YUV color format.

Returning to FIGS. 2a, 2b and 2c, the Identifying and counting unchanged blocks step 225, identifies counts a number of skipped sets of micro-blocks (unchanged blocks) in the YUV frame representation that was stored in the YUV buffer 125 at the step 220. A skipped set is a macro-block or micro-block of the currently received YUV frame stored in the YUV buffer 125 that is unchanged relative to an immediately preceding received image block (macro-block or micro-block) at an identical spatial location of a previously received decoded frame. In other words the received coded bit stream, received by the system 100, identifies in its fields or flags that the macro-blocks or one or more luminance micro-blocks Y1,Y2,Y3,Y4 and an associated set of two chrominance micro-blocks U,V are identified as unchanged. As will be apparent to a person skilled in the art, other combination of micro-blocs are possible depending upon the particular YUV color format.

The Identifying and counting unchanged blocks step 225 provides a map of skipped blocks and also provides a number to a variable "number of skipped blocks" indicative of the number of micro-blocks that have been skipped.

If a macro-block was skipped then this is deemed to be the same as four micro-blocks skipped. The Identifying and counting unchanged blocks step 225 is explained in more detail with specific reference to FIG. 2b. The step 225 performs identifying of the image blocks of the decoded currently received YUV frame that are unchanged relative to corresponding image blocks at an identical spatial location in an immediately preceding received decoded frame. In, for example, MPEG-4 and H.263 video coding standards a macro-block is defined as being skipped if a Motion Vector for the macro-block is zero and blocks Y1, Y2, Y3, Y4, U and V all contain only zero Discrete Cosine Transform (DCT) coefficients.

As an example, for MPEG-4 and H.263 coded bit streams (of a YUV4:2:0 format video), a micro-block can be defined as skipped if a number of conditions are satisfied. For instance, the micro-block Y1 of FIG. 3 can be defined as being skipped if:

1. The Motion Vector for the Macro-block 300 is 0;

2. Micro-block Y1 contains only zero DCT coefficients;

3. Micro-block U contains only zero DCT coefficients; and

4. Micro-block V contains only zero DCT coefficients.

For the above example of a skipped block, the step 225 firstly checks a first macro-block of the image frame and determines at a test 255 if the macro-block has been skipped during decoding. If yes, then a flag for the relevant macro-block is set at a step 259 and the variable "number of skipped blocks" (initially set to zero) is incremented by four. A test step 275 is then performed to determine if there are any more macro-blocks in the image frame to be tested.

If at test 255 it is determined that the Macro-block in question was not skipped then a micro-block test 275 is performed to determine if any of the four micro-blocks (block sets) of the macro-block in question were skipped. If none of the four micro-blocks were skipped then the test step 275 is performed to determine if there are any more macro-blocks in the image frame to be tested. Alternatively, if any of the four micro-blocks were skipped then a skipped flag for the relevant skipped micro-blocks is set at a setting step 270 and the variable "number of skipped blocks" is incremented by the number of micro-blocks skipped in the macro-block being assessed. Thereafter, the test step 275 is then performed to determine if there are any more macro-blocks in the image frame to be tested.

If the test step 275 determines that there are more macro-blocks to be tested the method returns to test 255. However, if all the macro-blocks have been tested then the step 225 is completed.

Referring back to FIG. 2a, at a threshold test 230 the variable "number of skipped blocks" is checked against a threshold value that is, for instance, 2% of the total number of micro-blocks comprising a frame. If the number of skipped micro-blocks does not exceed the threshold value then RGB color conversion is performed on all macro-blocks of the image stored in the YUV buffer 125 (conventional RGB color conversion) at step 235 and the resulting image is stored in RGB buffer 145 and displayed on the display module 150 at step 240. The RGB color conversion is well known and is typically performed by the following matrix of equation—(1).

$$\begin{bmatrix} R \\ G \\ B \end{bmatrix} = \begin{bmatrix} Y + 0 + 1.4026V \\ Y - 0.3444U - 0.7144V \\ Y + 1.7730U + 0 \end{bmatrix} \quad (1)$$

Alternatively, at test 230, if the number of skipped micro-blocks exceeds the threshold value then selective color conversion 280 and selectively updating 285 are performed using the map of skipped blocks generated by step 225.

The selective color conversion 280 is effected for Selectively performing YUG to RGB color conversion, typically, by using of the matrix of equation—(1). The color conversion is only on the image blocks of the currently received YUV frame that are not unchanged relative to the corresponding previous image blocks and the performing provides selected RGB converted blocks for the current frame. The skipped flags that were determined in step 225 are used in step 280 to identify those micro-blocks that do not require YUV to RGB color conversion. In this way step 280 is able to selectively perform color conversion using the map of skipped produced by step 225. A step 285 then provides for selectively updating image blocks in the RGB buffer with selected RGB converted blocks for the current frame.

The method 200 then goes to the displaying step 240 where the resulting RGB image stored in RGB buffer 145 is displayed on the display module 150. The method 200 then returns to the step 210 where the storing is implicit from the step of selectively updating 285 (but for clarity the step 210 indicates that the RGB buffer 130 is not cleared after displaying 240). The method 200 then repeats until no more frames (bit streams) are received or the system 100 is switched off.

Essentially, the method illustrated by the combination of FIGS. 2a and 2b effects both selectively performing YUG to RGB color conversion and selectively updating image blocks sequentially on a group comprising more than one macro-block and typically a frame (Frame Mode). In fact, RGB color conversion and selectively updating image blocks are conducted sequentially on a complete image. In contrast, it is possible to selectively perform YUG to RGB color conversion and the selectively update image blocks sequentially on each block (Block Mode) as illustrated by the combination of FIGS. 2a and 2c.

If at test step 216 the mode of operation is determined to be Block Mode then a block mode steps 408 are effected as shown specifically in FIG. 2c. When operating in Block Mode, a macro-block is decoded as shown in step 409 and the corresponding YUV data stored. Then a test 410 is conducted to determine if a selected macro-block has been skipped during decoding. If no, then at a test step 430 is conducted to determine if any micro-blocks of the current macro-block is skipped. If there are any micro-blocks (of the current macro-block) that are skipped then step 430 performs color conversion and updating only for those micro-blocks that are not skipped. However if at test step 420 it is determined that there are no micro-blocks that are skipped then color conversion and updating is performed for the whole macro-block at step 440.

After steps 420 or 440 a test step 450 is performed to determine if there are any more macro-blocks in the image frame to be tested by test 410. If at test 410 it is determined that the macro-block in question (selected macro-block) was skipped then no color conversion or updating is required and the method proceeds directly to step 450. If the test step 450 determines that there are more macro-blocks to be tested the method again returns to step 409. However, if all the macro-blocks have been tested then the method goes to the displaying step 240 of FIG. 2a.

Advantageously, the present invention provides for YUV to RGB color conversion by exploiting redundancy associated with the unchanged respective blocks of consecutive frames. This can therefore reduce computational overheads associated with YUV to RGB color conversion.

The detailed description provides preferred exemplary embodiments only, and is not intended to limit the scope, applicability, or configuration of the invention. Rather, the detailed description of the preferred exemplary embodiments provides those skilled in the art with an enabling description for implementing a preferred exemplary embodiment of the invention. It should be understood that various changes may be made in the function and arrangement of elements without departing from the spirit and scope of the invention as set forth in the appended claims. For instance, instead of counting the number of skipped blocks at step 225 and determining whether or not conventional RGB color converting is to be performed, selectively performing YUG to RGB can be performed on every image when in Frame Mode.

We claim:

1. A method for color conversion of at least part of a decoded currently received YUV frame representing an image, wherein the currently received YUV frame comprises image blocks, the method including:
    storing a previous color conversion RGB image in a buffer, the image being from an immediately preceding received decoded frame;
    identifying the image blocks of the decoded currently received YUV frame that are unchanged relative to corresponding image blocks at an identical spatial location in an immediately preceding received decoded frame;
    selectively performing YUV to RGB color conversion only on the image blocks of the currently received YUV frame that are not unchanged relative to the corresponding image blocks, the performing providing selected RGB converted blocks for the current frame; and
    selectively updating image blocks in the buffer with selected RGB converted blocks for the current frame.

2. A method for color conversion, as claimed in claim 1, wherein the image blocks are macro-blocks.

3. A method for color conversion, as claimed in claim 1, wherein the image blocks are micro-blocks.

4. A method for color conversion, as claimed in claim 2, wherein the image blocks also include micro-blocks.

5. A method for color conversion, as claimed in claim 1, the selectively performing YUV to RGB color conversion and the Selectively updating image blocks occur sequentially on each said macro-block.

6. A method for color conversion, as claimed in claim 1, wherein the selectively performing YUV to RGB color conversion and the Selectively updating image blocks occur sequentially on a group comprising more than one said macro-block.

7. A method for color conversion, as claimed in claim 3, wherein the method is only be effected if a threshold number of skipped sets of micro-blocks in the currently received YUV frame exceeds a threshold value, wherein a skipped set is a macro-block or micro-block of the currently received YUV frame that is unchanged relative to corresponding image blocks at an identical spatial location in an immediately preceding received decoded frame.

8. A method for color conversion, as claimed in claim 1, wherein after the selectively updating image blocks in the buffer with selected RGB converted blocks for the current frame, an RGB image in the RGB buffer is displayed on a display module.

9. A method for color conversion, as claimed in claim 1, wherein the method is effected in frame mode.

10. A method for color conversion, as claimed in claim 1, wherein the method is effected in block mode.

11. A video color converter for color conversion of at least part of a decoded currently received YUV frame representing an image, wherein the currently received YUV frame comprises image blocks, the video color converter including:
    a YUV buffer;
    a RGB buffer; and
    a color conversion module with an input coupled to an output of the YUV buffer, the color conversion module also has a output coupled to an input of the RGB buffer, Wherein, in use, a previous color conversion RGB image, converted by the color conversion module, is stored in the RGB buffer, the image being from an immediately preceding received decoded frame, and wherein the color conversion module selectively performs YUG to RGB color conversion only on image blocks of a currently received YUV frame that are not unchanged relative to corresponding previous image blocks at an identical spatial location in an immediately preceding decoded frame, the performing providing selected RGB converted blocks for the current frame, and thereafter image blocks in the RGB buffer are Selectively updated.

12. A video color converter as claimed in claim 11, further including a display module, wherein, in use after the selectively updating image blocks in the buffer with selected RGB converted blocks for the current frame, an RGB image in the RGB buffer is displayed on the display module.

13. A video decoding system for decoding a coded video bit stream, the system comprising:
    a receiver module for receiving the coded video bit stream;
    a decoding module with an input coupled to an output of the receiver module;
    a video color converter having an input coupled to an output of the decoding module, the video color converter having a YUV buffer, a RGB buffer, and a color conversion module with an input coupled to an output of the YUV buffer, the color conversion module also has a output coupled to an input of the RGB buffer,
    wherein, in use, the video color converter provides for color conversion of at least part of a decoded currently received and decoded bit stream in the form of a currently received YUV frame representing an image comprising image blocks, and a previous color conversion RGB image, converted by the color conversion module, is stored in the RGB buffer, the image being from an immediately preceding received decoded frame, and wherein the color conversion module selectively performs YUG to RGB color conversion only on image blocks of a currently received YUV frame that are not unchanged relative to corresponding image-blocks at an identical spatial location in an immediately preceding received decoded frame, the performing providing selected RGB converted blocks for the current frame, and thereafter image blocks in the RGB buffer are Selectively updated.

14. A video decoding system, as claimed in claim 13, further including a display module, wherein, in use after the selectively updating image blocks in the buffer with selected RGB converted blocks for the current frame, an RGB image in the RGB buffer is displayed on the display module.

* * * * *